United States Patent [19]

Sanders et al.

[11] Patent Number: 4,482,530

[45] Date of Patent: Nov. 13, 1984

[54] METHOD OF MAKING ZEOLITE Y

[75] Inventors: Robert N. Sanders, Baton Rouge; Sebastian M. Laurent, Greenwell Springs, both of La.

[73] Assignee: Ethyl Corporation, Richmond, Va.

[21] Appl. No.: 454,377

[22] Filed: Dec. 29, 1982

[51] Int. Cl.$^3$ ............................................. C01B 33/28
[52] U.S. Cl. ................................... 423/329; 423/328; 423/118; 502/79
[58] Field of Search .................. 423/328, 329; 502/79; 423/118

[56] References Cited

U.S. PATENT DOCUMENTS

| | | | |
|---|---|---|---|
| 3,130,007 | 4/1964 | Breck | 423/329 |
| 3,386,802 | 6/1968 | Michalko | 423/328 |
| 3,433,587 | 3/1969 | Haden et al. | 423/118 |
| 3,472,617 | 10/1969 | McDaniel et al. | 423/118 |
| 3,506,594 | 4/1970 | Haden et al. | 423/329 |
| 4,400,366 | 8/1983 | Sanders | 423/329 |
| 4,436,708 | 3/1984 | Sanders | 502/79 |

FOREIGN PATENT DOCUMENTS 47-26598  7/1972  Japan ............................. 423/328

Primary Examiner—Edward J. Meros
Assistant Examiner—Steven Capella
Attorney, Agent, or Firm—Donald L. Johnson; John F. Sieberth; Paul H. Leonard

[57] ABSTRACT

The present invention relates to a process for producing a crystalline synthetic faujasite of the zeolite "Y" type of a predetermined particle size wherein an activated system is provided by mixing a sodium silicate solution with a seed amount of zeolite "Y" type synthetic faujasite and the activated system is reacted with a sodium aluminate solution under controlled conditions to thereby form a low water reaction mixture or system and then a crystalline synthetic faujasite of the zeolite "Y" type of the predetermined particle size.

23 Claims, No Drawings

METHOD OF MAKING ZEOLITE Y

BACKGROUND OF THE INVENTION

1. Field of the Invention

In general, the present invention relates to the production of synthetic faujasites or zeolites and more especially to zeolite Y.

2. Description of the Prior Art

Certain naturally occurring hydrated metal aluminum silicates are called zeolites. The synthetic adsorbents of the invention have compositions similar to some of the natural zeolites. The most common of these zeolites are sodium zeolites. Zeolites are useful as detergent builders, cracking catalysts and molecular sieves.

Zeolites consist basically of a three-dimensional frame work of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion of the crystal of a cation, for example, a sodium ion. This balance may be expressed by the formula $Al/Na=1$. The spaces between the tetrahedra are occupied by water molecules prior to dehydration.

Zeolite Y may be distinguished from other zeolites and silicates on the basis of their X-ray powder diffraction patterns and certain physical characteristics. The X-ray patterns for several of these zeolites are described below. The composition and density are among the characteristics which have been found to be important in identifying these zeolites.

The basic formula for all crystalline sodium zeolites may be represented as follows:

$$Na_2O.Al_2O_3.xSiO_2.yH_2O$$

In general, particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite Y, an average value for "x" is about 4.5 with the "x" value falling within the range $4.5\pm1.5$.

The value of "y" is not necessarily an invariant for all samples of zeolites. This is true because various exchangeable ions are of different size, and, since there is no major change in the crystal lattice dimensions upon ion exchange, the space available in the pores of the zeolites to accommodate water molecules varies.

The formula for zeolite Y may be written as follows:

$$0.9\pm0.2Na_2O.Al_2O_3.4.5\pm1.5\ SiO_2.yH_2O;$$

and, "y" may be any value up to 9.

The pores of zeolites normally contain water.

The above formulas represent the chemical analysis of zeolite Y. When other materials as well as water are in the pores, chemical analysis will show a lower value of "y" and the presence of other adsorbates. The presence in the crystal lattic of materials volatile at temperatures below about 600° C. does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction pattern has been found to be a useful tool. In obtaining X-ray powder diffraction patterns, standard techniques are employed. The radiation is the Ka doublet of copper, and a Geiger counter spectrometer with a strip chart pen recorder is used. The peak heights, I, and the positions as a function of $2\theta$ where $\theta$ is the Bragg angle, are read from the spectrometer chart. From these, the relative intensities, $100I/I_o$, where $I_o$ is the intensity of the strongest line or peak, and "d" the interplanar spacing in Å corresponding to the recorded lines are calculated.

X-ray powder diffraction data for sodium zeolite Y are given in Table A. Relative Intensity ($100I/I_o$) and the "d" values in angstroms (Å) for the observed lines for zeolite Y are shown. In a separate column are listed the sum of the squares of the Miller indices ($h^2+k^2+l^2$) for a cubic unit cell that corresponds to the observed lines in the X-ray diffraction patterns.

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently, these additional materials can be indicated as initial reactants in the synthesis of the zeolite, or as other crystalline substances. When the zeolite is heat treated at temperatures of between 100° C. and 600° C. in the presence of water vapor or other gases or vapors, the relative intensities of the lines in the X-ray pattern may be appreciably changed from those existing in the unactivated zeolite pattern. Small changes in line position may also occur under these conditions. These changes in no way hinder the identification of these X-ray patterns as belonging to the zeolite.

TABLE A

X RAY DIFFRACTION PATTERN FOR SYNTHETIC ZEOLITE Y

| $h^2 + k^2 + l^2$ | d (Å) | Relative Intensity |
|---|---|---|
| 3 | 14.29 | 100 |
| 8 | 8.75 | 9 |
| 11 | 7.46 | 24 |
| 19 | 5.68 | 44 |
| 27 | 4.76 | 23 |
| 32 | 4.38 | 35 |
| 40 | 3.91 | 12 |
| 43 | 3.775 | 47 |
| 48 | 3.573 | 4 |
| 51 | 3.466 | 9 |
| 56 | 3.308 | 37 |
| 59 | 3.222 | 8 |
| 67 | 3.024 | 16 |
| 72 | 2.917 | 21 |
| 75 | 2.858 | 48 |
| 80 | 2.767 | 20 |
| 83 | 2.717 | 7 |
| 88 | 2.638 | 19 |
| 91 | 2.595 | 11 |
| 108 | 2.381 | 6 |
| 123 | 2.232 | 2 |
| 128 | 2.188 | 4 |
| 131 | 2.162 | 3 |
| 139 | 2.099 | 5 |
| 144 | 2.062 | 3 |
| 164 | 1.933 | 2 |
| 168 | 1.910 | 3 |
| 179 | 1.850 | 2 |
| 187 | 1.810 | 2 |
| 192 | 1.786 | 1 |

TABLE A-continued

X RAY DIFFRACTION PATTERN FOR SYNTHETIC ZEOLITE Y

| $h^2 + k^2 + l^2$ | d (Å) | Relative Intensity |
|---|---|---|
| 195 | 1.772 | 2 |
| 200 | 1.750 | 4 |
| 211 | 1.704 | 5 |

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials, which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in "American Mineralogist," Vol. 28, Page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

In U.S. Pat. No. 3,119,659, a kaolin clay and sodium hydroxide are formed into a compact body, dried, reacted in an aqueous mixture at a temperature of from 20° C. to 175° C. until a zeolite is formed. A synthetic faujasite of the type of zeolite Y is formed in a reaction mixture having an $Na_2O/SiO_2$ molar ratio of 1.5:1, an $SiO_2/Al_2O_3$ molar ratio of 5:1, and an $H_2O/Na_2O$ molar ratio of 30:1 to 60:1. Zeolite Y is formed in a reaction mixture having an $Na_2O/SiO_2$ molar ratio of 0.5:1, and $SiO_2/Al_2O_3$ molar ratio of 20:1 to 40:1.

U.S. Pat. No. 3,920,789 discloses a process for making zeolite Y using elevated temperatures and pressures for the crystallization stage followed by very rapid cooling of the reaction mass.

In U.S. Pat. No. 3,130,007, zeolite Y is formed by preparing an aqueous sodium alumino silicate mixture having a certain composition, maintaining the mixture at a temperature of 20° C. to 125° C. until zeolite Y is formed, and separating the zeolite Y from the mother liquor. Table B shows reaction mixture compositions that produce zeolite Y.

TABLE B

U.S. Pat. No. 3,130,007
REACTION MIXTURE COMPOSITIONS FOR ZEOLITE Y

| $Na_2O/SiO_2$ | $SiO_2/Al_2O_3$ | $H_2O/Na_2O$ |
|---|---|---|
| 0.20–0.40 | 10–40 | 25–60 |
| 0.41–0.60 | 10–30 | 20–60 |
| 0.61–1.0 | 7–30 | 20–60 |
| 0.6–1.0 | 8–30 | 12–90 |
| 1.5–1.7 | 10–30 | 20–90 |
| 1.9–2.1 | 10 | 40–90 |

U.S. Pat. No. 3,130,007 indicates in Column 2, lines 35–42, the necessity of using an active silica source by specifying that aqueous colloidal silica sols or reactive amorphous solid silicas are preferred.

In U.S. Pat. No. 4,016,246, zeolite Y is formed by preparing an aqueous alumino silicate reaction mixture by mixing an alumina component and an $Na_2O$ component with an active hydrate sodium metasilicate to form a certain reaction mixture, than heating the mixture at a temperature of 20° C. to 120° C. until zeolite Y is formed. Table C shows reaction mixture compositions that produce zeolite Y.

TABLE C

U.S. Pat. No. 4,016,246
REACTION MIXTURE COMPOSITIONS FOR ZEOLITE Y

| $Na_2O/SiO_2$ | $SiO_2/Al_2O_3$ | $H_2O/Na_2O$ |
|---|---|---|
| 0.28–<0.30 | 8–10 | 20–70 |
| 0.30–<0.31 | 8–12 | 20–70 |
| 0.31–<0.32 | 8–14 | 20–70 |
| 0.32–<0.34 | 8–16 | 12–90 |
| 0.34–<0.40 | 7–40 | 12–120 |
| 0.4–<1.0 | 5–50 | 12–120 |
| 0.7–<1.0 | 31–50 | 12–120 |

U.S. Pat. No. 4,016,246 also discusses the significance of using an activated source of sodium silicate. In such patent an active hydrated sodium metasilicate is prepared by carefully hydrating sodium metasilicate under specified conditions.

U.S. Pat. No. 4,166,099 discloses a process for preparing crystalline aluminosilicate zeolites, particularly synthetic faujasites such as zeolite type X and zeolite type Y utilizing especially prepared nucleating centers or seeds. Such seed preparation is lengthy and involved.

U.S. Pat. No. 4,164,551 discloses a process for making zeolite Y also utilizing specifically prepared nucleating centers.

U.S. application Ser. No. 299,878 filed on Sept. 8, 1981, now U.S. Pat. No. 4,400,366 discloses a process for making synthetic faujasites of the Zeolite Y type of an exceptionally high crystallinity. Such process requires a substantial water to silica ratio in the reaction mixture. This application is specifically incorporated herein.

U.S. application Ser. No. 415,428, filed on Sept. 7, 1982, now U.S. Pat. No. 4,436,708 is a modification of such process wherein substantially smaller amounts of water are utilized. This application is also specifically incorporated herein.

One of the primary uses of "Y" type zeolites or Zeolite Y is as a cracking catalyst component. The size of the particles of such zeolites is relatively small necessitating that the particles be placed on a carrier of a larger particle size to be effectively used as fluid cracking catalysts. The latter have a particle size range of about 65–80 microns.

It is therefore an important object of the present invention to provide a synthetic faujasite of the zeolite Y type and one which has a particle size sufficiently large that the zeolite Y is readily fluidizable in conventional fluidized cracking units.

It is another object of the present invention to provide an artificial or synthetic faujasite of the zeolite Y type which has an average particle size range of about 65–80 microns.

Still another object of the present invention is to provide a process for producing a zeolite Y which is commercially acceptable as a cracking catalyst without the necessity of a carrier.

Yet another object of the invention is to provide a zeolite Y product which has high crystallinity, which can be manufactured at reduced costs and which has a predetermined particle size.

Other objects and advantages of the invention will be more readily apparent from a reading of the description hereinafter.

SUMMARY OF THE INVENTION

The present invention is directed to the preparation of synthetic or artificial faujasites, namely zeolite Y, wherein a seed quantity of zeolite Y is mixed with sodium silicate and a relatively small amount of water with agitation for up to about five hours at ambient temperature. The entire system is cooled to about $-5°$ C. to $0°$ C. and sodium aluminate which has been pre-cooled to about $0°$ C. is added. The system is warmed up to ambient temperature and then held at such temperature for up to about 24 hours. The gel-like mixture is dried and particulated to a desired size. After the desired particle size has been achieved, the mixture is reslurried in water and then heated to about $80°$ C. to $120°$ C. The reaction is continued at such temperature with stirring until the desired crystalline product of a predetermined particle size is formed. Zeolite Y of relatively large particles is then filtered out and dried in a suitable drying apparatus.

DESCRIPTION OF THE PREFERRED EMBODIMENTS

Zeolites X and Y are names given to synthetic or artificial zeolites having the crystal structure of the naturally occurring mineral, faujasite. Zeolite X is the name for those compounds having an $SiO_2/Al_2O_3$ ratio of less than 3 while zeolite Y is the name for those compounds with a ratio of 3 or greater. As synthesized Zeolite Y is known to have ratios upwards to 7 but those with $SiO_2/Al_2O_3$ in the range of about 4.0 to 5.5 are most commonly utilized. The process of this invention is for making a zeolite Y.

The seed used in making a zeolite Y is preferably a relatively small or seed quantity of a zeolite Y from a previously prepared bulk batch.

In general, a sodium silicate solution and a sodium aluminate solution are each separately prepared. Sand is dissolved in a sodium hydroxide solution at a pressure of at least 100 psig and a temperature of at least $180°$ C. to produce a sodium silicate solution having a silica to sodium oxide molar ratio of between 1.7:1 and 4.2:1 for preparing zeolite Y. Any other suitable process for preparing the sodium silicate solution may be used. Any suitable process for preparing the sodium aluminate solution may also be used.

An activated system is prepared by mixing a relatively small amount of the seed or bulk zeolite of the zeolite Y type with sodium silicate.

Faujasite seed may be used in amounts of about one percent to ten percent by weight of the mixture. Amounts below five weight percent do not produce as effective yields. The amount of seed zeolite used is not critical other than that it should be a sufficient amount to provide the necessary activation of the sodium silicate system. Larger amounts may be used since the zeolite is in the final product, but obviously, as weight percent of seed goes above ten, the economics of the process diminishes.

A mixture of faujasite and sodium silicate provides a suitable activated system. Activation is accompanied by agitation, with stirring being adequate. Agitation is continued at ambient temperature up to about three hours. A longer time may be used if desired, but should be unnecessary. The mixture or system is then cooled to about $-5°$ C. to about $0°$ C. Temperature as well as times may be varied, but the activation period or mixing of bulk or seed zeolite with sodium silicate must be at least about one-half hour.

Preferably, the sodium aluminate solution is independently cooled to a temperature of about $0°$ C. and then slowly added with agitation to the sodium silicate system. While mixing, the temperature of the system is maintained at or near $0°$ C. Mixing is continued from about five minutes to about five hours.

After addition of the sodium aluminate is completed, agitation is stopped and the system is warmed to ambient temperature. The mixture is then allowed to stand at such temperature up to about sixteen hours. A standing time of about six to sixteen hours is usually necessary in preparing zeolite Y.

The reaction mixture comprises a sodium silicate mother liquor and an amorphous sodium alumino-silicate pigment and for zeolite Y, the mixture or system has the following molar ratios: sodium oxide to silica 0.5:1 to 1:1; silica to alumina—10:1 to 15:1; and water to sodium oxide—17:1 to 30:1; and, preferably molar ratios of 0.6:1 to 0.8:1, 10.5:1 to 12.5:1 and 10:1 to 15:1, respectively, and, most preferred molar ratios of 0.7:1, 12.5:1, and 25:1, respectively.

After standing, the system or gel mixture formed is dried and particulated. Spray drying is the most preferred means and probably the only economical means of drying and particulating the zeolite Y to the desired particle size. The spray drier is operated in such a manner as to produce product particles in 65–80 micron range. Such particle size is ideal for fluid cracking catalysts. It can be appreciated that particles of other desired sizes or range of sizes can be prepared as product requirements dictate.

The dried zeolite Y particles of the desired or predetermined size are than reslurried in water. The amount of water used is sufficient to provide adequate fluidization.

The reslurried mixture or system is heated to a temperature of about $80°$ C. to $120°$ C. and preferably about $90°$ C. to $105°$ C. The mixture is reacted at similar temperatures. An oil bath is conveniently used, agitation with stirring or by other suitable means is appropriate. The temperature is maintained until the crystralline synthetic faujasite of the zeolite Y type of the desired particle size is formed, normally about an hour. The oil bath heating step may be performed at temperatures of about $0°$ C. to $90°$ C. for about four to six hours. Such lower temperatures require longer heating times.

In one preferred process, about 1.8 parts of zeolite Y powder, on a dry weight basis, are mixed with 100 parts by weight of sodium silicate, and stirred at ambient temperature for about three hours. The mixture is then cooled to about −4° C. About 25.5 parts of sodium aluminate is independently cooled at about 0° C., then added slowly with vigorous agitation to the system while maintaining the temperature at or near 0° C. After addition of the sodium aluminate is complete, agitation is stopped and the system is warmed to ambient temperature. The system is then allowed to stand at such temperature for about 16 hours. The system or gel mixture is spray dried at a dryer outlet temperature of about 115° C. to form zeolite Y particles of a size ranging about 65 to 80 microns. The dried particles are then slurried in water. Thereafter, the system is heated in a 110° C. oil bath to a temperature of about 90°–100° C. with stirring. This temperature is maintained for about one hour after which solid zeolite Y having a particle size of about 65–75 microns is filtered out, dried in an oven or other suitable means and recovered.

A linear relationship exists between product silica to alumina ratio and the silica utilization. This latter is limited to about 10–20 weight percent to produce the desired 4.5 ratio product. An alumina to water ratio of about 1:200 is all that is required.

The invention is further illustrated by the following examples which set forth various methods and compositions.

EQUIPMENT

The reaction vessel was a 3-neck, 300 ml, round-bottom flask. An Ace Glass, Teflon, single-blade, ground glass, joint stirrer was used in the center position. This was driven by an electric motor. The shaft rpm was 200 except during reactant mixing when it was increased to 500 rpm. One neck was equipped with a thermometer. The other neck allowed use of a dropping funnel (syringe needle for those experiments where materials were added during the cool period when the thermometer was replaced with a condenser) during mixing and a condenser during the cook period. The products were filtered on fine frit-glass filter funnels and dried in a 115° C. oven.

EXPERIMENTAL PROCEDURE

Seed activation was in a sealed vessel submerged in a 90° C. oil bath. This was for 3 hours using the seed and sodium silicate. The system was stirred continuously. The product was then removed, cooled and mixed with water (if any used) in a 300 milliliter 3 mesh round bottom flask equipped with a thermometer and stirrer. The third neck was stoppered and the liquids cooled to −5° C. with slow agitation. The stopper was removed and the agitation increased to about 400 rpm on the stirrer while the sodium aluminate was dropped in over a period of about 20 minutes. This was done using a 60 milliliter syringe and a Sage Syringe pump set at 150×0.1. The cooling bath was then removed, the stirrer shut off and the third neck closed with a reflux condenser. The unit stood at ambient temperature for 16 hours then was heated, with stirring, using an oil bath at 150° C. Drying was conducted in an oven at 115° C. After 24 hours, the solids were removed and transferred to a dry box. The solids were somewhat like taffy, but solidified upon cooling. The solidified solids were ground with a mortar and pestle through a 60 mesh (U.S. Sieve Series) screen until about 20 to 22 grams of product were obtained. After screening, 20.4 grams of product was slurried with 39.5 grams of water and refluxed with stirring. Heating up to 90° C. took about 20 minutes and reflux was continued for 6 hours. The solids were then filtered out, washed in distilled water and dried at 115° C. for 16 hours.

REAGENTS

Sodium aluminate had a composition of 13.95 percent $Na_2O$ and 12.8 percent $Al_2O_3$. Sodium silicate was as follows:
12.7 percent: $Na_2O$
23.0 percent: $SiO_2$
balance: $H_2O$

SEED PREPARATION

Seed sample is identified as "a" and was prepared by following U.S. Pat. No. 4,166,099, Example 1, Method A. Although not wishing to be bound by any particular theory, it is believed that the seed or bulk product is activated when mixed with a sodium silicate solution; however, it is only important that an activated system be prepared. The terms seed activation or activated seed are used herein to describe the step of mixing or contacting the seed or bulk product with a sodium silicate solution or a sodium silicate solution containing caustic and/or water.

For the experiments seed activation was accomplished by refluxing the ground seed, i.e. bulk product, in sodium silicate, with rapid stirring for a period of three hours.

ZEOLITE Y PRODUCTION

Following the experimental conditions described hereinbefore, the results are described in Table D.

TABLE D

| Run No. | 1 |
|---|---|
| Seed* | a |
| Weight Percent Seed** | 10 |
| Reaction Mixture or Mixture or System (Moles) | $8.5Na_2O.Al_2O_3.12.5SiO_2.333.8H_2O$ |
| Silicate Ratio $SiO_2/Na_2O$ | 1.87 |
| Sodium Silicate Amount (Grams) | 94.3 |
| Sodium Aluminate Amount (Grams) | 23.1 |
| Additional Water (Grams) | 70.6 |
| Product*** (Grams) | 12.5 |
| Crystallinity As Percent of Standard | 166 |
| Ratio $SiO_2/Al_2O_3$ | 3.7 |

*Seed Linde 13X Commercial Zeolite Y
**Based on theoretical product with $SiO_2/Al_2O_3$ at 4.5 and 100 percent utilization 1.65 grams
***After drying, the product had a particle size of 72.4 microns. The final product had a particle size of 65.0 microns.

From the foregoing, it is readily seen that there is only about a ten percent decrease in particle size from after drying to after crystallization.

The present invention provides an economical process for producing a commercially acceptable controlled particle size Zeolite Y. In such process, cooling cost, reflux costs, handling costs and investment costs are all reduced. The present invention also enables a larger quantity of product to be produced in the same equipment.

Zeolite Y made by the process has a crystallinity as good or better than the present commercially acceptable standard.

The Zeolite Y of the present invention has particular utility as a catalyst base or component.

The instant invention permits a fluidized cracking catalyst of substantially 100 percent active catalyst in contrast to 15 percent active catalysts of the prior art.

For a commercial process, spray-drying is preferable, largely because of economics and process facilitation. Some preliminary tests using pilot plant scale spray drying equipment have been run, but the results were not satisfactory. A Zeolite Y type product was made, but the particles were not of the desired size. Large scale or commercial spray-drying equipment should produce the type of drying necessary to make the desired particle size Zeolite Y.

The foregoing disclosure and description of the invention is illustrative and explanatory thereof and various changes in the illustrated process may be made within the scope of the appended claims without departing from the spirit of the invention.

What is claimed is:

1. A method of producing a crytalline synthetic faujasite of the zeolite "Y" type of a desired particle size, comprising the steps of separately preparing a sodium silicate solution and a sodium aluminate solution, providing an activated low water system comprising a sodium silicate solution with a seed amount up to about 10 percent by weight of the mixture of synthetic faujasite of the Zeolite "Y" type, mixing the sodium aluminate solution with the activated system over a period of up to about five hours to form a reaction mixture having the following molar ratios:
sodium oxide to silica—0.5:1 to 1:1,
silica to alumina—10:1 to 15:1, and
water to sodium oxide—17:1 to 30:1,
allowing the mixture to stand for up to about 24 hours at a temperature from about 0° C. to ambient, drying and particulating the resulting mixture to a Zeolite "Y" of a particle size of about 65 to 80 microns, slurrying the particles and then heating the mixture to a temperature of about 80° C.–120° C. until the desired crystalline synthetic faujasite of the Zeolite "Y" type is formed, and recovering said Zeolite "Y" of an average particle size range of about 65 to 80 microns.

2. The method of claim 1, wherein said seed amount of synthetic faujasite is about five to ten weight percent.

3. The method of claim 1, wherein said seed amount of synthetic faujasite is bulk product obtained from a previously prepared bulk synthetic crystalline Zeolite "Y".

4. The method of claim 1, wherein the activating seed synthetic faujasite is added in an amount of about 1% to 5% by weight of the mixture.

5. The method of claim 1, wherein the activating period is from about five minutes to about five hours.

6. The method of claim 1, wherein the mixture is allowed to stand up to about sixteen hours at ambient temperature.

7. The method of claim 1, wherein the mixture is allowed to stand for a period of time of at least six hours.

8. The method of claim 1, wherein the mixture is heated and reacted to a temperature of about 90° C. to 105° C.

9. The method of claim 1, wherein the total mixture has the following molar ratio:

$(4.5-8.5)Na_2O.Al_2O_3.(10.0-16.0)SiO_2.(145-200)H_2O.$

10. The method of claim 1, wherein the reactants are mixed at a temperature at least as low as about 0° C.

11. The method of claim 1, wherein the reactants are mixed with agitation by stirring.

12. The method of claim 1, wherein the drying and particulating step is conducted in a spray dryer.

13. The method of claim 1, wherein the drying after standing is conducted at a temperature of about 115° C.

14. The method of claim 1, wherein the dried particles are slurried in water.

15. A method of preparing a crystalline zeolite Y, comprising the steps of:
(a) preparing a sodium silicate solution having a silica to sodium oxide molar ratio of between 1.7:1 and 4.2:1;
(b) providing an activated system comprising a seed amount of bulk zeolite Y up to about 10 percent by weight of the mixture at a temperature up to about 0° C.;
(c) forming a sodium aluminate solution;
(d) adding the sodium aluminate to the activated system over a period of from about five minutes to five hours with stirring to produce a reaction mixture comprising a sodium silicate mother liquor and an amorphous sodium alumino silicate pigment, said mixture having a sodium oxide to silica molar ratio of between 0.5:1 and 1:1, a silica to alumina molar ratio of between 10:1 and 15:1, and a water to sodium oxide molar ratio of between 17:1 and 30:1;
(e) allowing the mixture to stand up to about 24 hours at a temperature of about 0° C. to ambient;
(f) drying the mixture of step (e) and particulating same to a particle size range of about 65 to 80 microns;
(g) slurring the particles produced in step (f) in water;
(h) heating and reacting the particles of step (g) at a temperature of about 80° C. to 120° C. until crystalline zeolite Y of a particle size range of about 65 to 80 microns is formed; and
(i) recovering the zeolite Y of a particle size range of about 65 to 80 microns.

16. The method of claim 15, wherein the seed amount of bulk zeolite Y is about five percent to about ten percent by weight of the mixture.

17. The method of claim 15, wherein the temperature of step (b) is from about $-5°$ C. to about 0° C.

18. The method of claim 15, wherein in step (d), the mixture has the following molar ratios:
sodium oxide to silica—0.6:1 to 0.8:1
silica to alumina—10.5:1 to 12.5:1
water to sodium oxide—20:1 to 25:1

19. The method of claim 15, wherein in step (d), the mixture has the following molar ratios:
sodium oxide to silica—0.7:1
silica to alumina—12.5:1
water to sodium oxide—25:1

20. The method of claim 15, wherein in step (e), the period of standing or warming is about six to 24 hours.

21. The method of claim 15, wherein in step (e), the temperature is ambient temperature and the period of standing is up to about sixteen hours.

22. The method of claim 15, wherein the heating and reacting temperature of step (h) is about 90° C. to 105° C.

23. The method of claim 15, wherein the mixture of step (e) is dryed in a spray dryer in step (f).

* * * * *

UNITED STATES PATENT AND TRADEMARK OFFICE
CERTIFICATE OF CORRECTION

PATENT NO. : 4,482,530

DATED : November 13, 1984

INVENTOR(S) : Robert N. Sanders and Sebastian M. Laurent

It is certified that error appears in the above-identified patent and that said Letters Patent is hereby corrected as shown below:

Column 7, Line 59, reads "150°C" and should read -- 105°C --.

Column 8, Line 31, reads "Table D" and should read -- Table I --.

Column 8, Line 32, reads "Table D" and should read -- Table I --.

Column 9, Line 2, reads "as a catalyst base or component" and should read -- as a catalyst or catalyst base or component --.

Signed and Sealed this

Ninth Day of April 1985

[SEAL]

Attest:

DONALD J. QUIGG

Attesting Officer     Acting Commissioner of Patents and Trademarks